United States Patent
Jo et al.

(10) Patent No.: US 10,811,919 B2
(45) Date of Patent: Oct. 20, 2020

(54) BLDC MOTOR AND CLEANER HAVING THE SAME

(71) Applicant: LG ELECTRONICS INC., Seoul (KR)

(72) Inventors: Changhum Jo, Seoul (KR); Kyunghoon Lee, Seoul (KR); Kwangyong Jang, Seoul (KR); Jongwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/547,174

(22) PCT Filed: Jan. 28, 2016

(86) PCT No.: PCT/KR2016/000956
§ 371 (c)(1),
(2) Date: Jul. 28, 2017

(87) PCT Pub. No.: WO2016/122235
PCT Pub. Date: Aug. 4, 2016

(65) Prior Publication Data
US 2018/0026486 A1      Jan. 25, 2018

(30) Foreign Application Priority Data
Jan. 28, 2015   (KR) .................. 10-2015-0013691

(51) Int. Cl.
*H02K 1/27* (2006.01)
*A47L 9/22* (2006.01)
*H02K 1/28* (2006.01)

(52) U.S. Cl.
CPC ................ *H02K 1/278* (2013.01); *A47L 9/22* (2013.01); *H02K 1/28* (2013.01)

(58) Field of Classification Search
CPC ........... H02K 1/272; H02K 1/278; H02K 1/27
(Continued)

(56) References Cited

U.S. PATENT DOCUMENTS

| 4,729,160 A | * | 3/1988 | Brown ................... | H02K 1/278 29/447 |
| H591 H | * | 3/1989 | Leupold .................... | 29/416 |

(Continued)

FOREIGN PATENT DOCUMENTS

| CN | 103929035 | 7/2014 |
| EP | 1 263 116 | 12/2002 |

(Continued)

OTHER PUBLICATIONS

Z.Q.Zhu et al. "Comparison of Halbach magnetized brushless machines based on discrete magnet segments or a single ring magnet", IEEE Transactions on Magnetics, Year: 2002, vol. 38, Issue: 5, pp. 2997-2999. (Year: 2002).*

(Continued)

*Primary Examiner* — Burton S Mullins
(74) *Attorney, Agent, or Firm* — Ked & Associates, LLP (57) ABSTRACT

A brushless direct current (BLDC) motor is disclosed. The BLDC motor includes a shaft made of a nonmagnetic material, a plurality of magnets surrounding the outer circumference of the shaft, a stator surrounding the outer circumferences of the magnets, wherein each of the magnets has an arc-shaped outer circumferential surface, an arc-shaped inner circumferential surface facing the shaft, and opposite side surfaces facing other adjacent magnets, and the magnets include a first magnet magnetized in a direction directed from the outer circumferential surface to the inner circumferential surface, a second magnet magnetized in a direction directed from the inner circumferential surface to the outer circumferential surface, and a third magnet mag- (Continued)

netized in a direction directed from one side surface to the other side surface. The efficiency of the motor is improved while eddy current loss is minimized.

9 Claims, 5 Drawing Sheets

(58) Field of Classification Search
USPC .................. 310/43, 156.01, 156.43, 156.08
See application file for complete search history.

(56) References Cited

U.S. PATENT DOCUMENTS

| | | | | |
|---|---|---|---|---|
| 5,300,910 | A * | 4/1994 | Unkelbach | H01F 7/0284 335/302 |
| 5,337,472 | A * | 8/1994 | Leupold | H01F 7/0278 29/415 |
| 5,523,731 | A * | 6/1996 | Leupold | G01R 33/383 29/607 |
| 6,169,352 | B1 * | 1/2001 | Hull | H02K 7/025 310/156.43 |
| 6,376,959 | B1 * | 4/2002 | Leupold | H02K 16/02 310/166 |
| 6,396,186 | B1 * | 5/2002 | Post | H02K 7/025 310/156.43 |
| 7,228,616 | B2 * | 6/2007 | Stephens | H02K 1/278 29/598 |
| 7,560,841 | B2 * | 7/2009 | Honkura | H01F 7/0273 310/156.43 |
| 8,004,141 | B2 * | 8/2011 | Jeung | H02K 29/03 310/156.45 |
| 8,608,459 | B2 * | 12/2013 | Hoefer | F04D 19/042 318/400.32 |
| 9,041,230 | B2 * | 5/2015 | Arnold | H02K 35/04 290/1 R |
| 2002/0180294 | A1 | 12/2002 | Kaneda et al. | |
| 2006/0186751 | A1 * | 8/2006 | Kim | H02K 1/278 310/156.44 |
| 2007/0222317 | A1 | 9/2007 | Morel | |
| 2009/0021105 | A1 * | 1/2009 | Evans | H02K 1/02 310/261.1 |
| 2010/0196174 | A1 * | 8/2010 | Lee | F04D 25/0606 417/410.1 |
| 2010/0219921 | A1 * | 9/2010 | Yamashita | C22C 33/0278 335/302 |
| 2014/0300233 | A1 | 10/2014 | Arimatsu | |
| 2014/0359969 | A1 * | 12/2014 | Kim | H02K 1/278 15/412 |
| 2015/0084446 | A1 * | 3/2015 | Atar | H02K 16/00 310/43 |
| 2015/0086398 | A1 * | 3/2015 | Teufl | H02K 1/2733 417/423.7 |
| 2015/0265121 | A1 * | 9/2015 | Kim | H02K 21/16 15/319 |
| 2015/0380146 | A1 * | 12/2015 | Moon | H01F 13/003 335/284 |

FOREIGN PATENT DOCUMENTS

| | | | | |
|---|---|---|---|---|
| EP | 2 378 641 | | 10/2011 | |
| EP | 2 814 142 | | 12/2014 | |
| JP | H07-177690 | | 7/1995 | |
| JP | H 09-049572 | | 6/1997 | |
| JP | 2002-354721 | | 12/2002 | |
| JP | 2009-219312 | * | 9/2009 | ............... H02K 1/27 |
| JP | 2012-065379 | | 3/2012 | |
| KR | 10-2012-0048511 | | 5/2012 | |
| KR | 10-2014-0145059 | | 12/2014 | |

OTHER PUBLICATIONS

X.Zhang et al. "Electromagnetic Performance Analysis and Optimal Design of Modular Machine with Halbach Permanent-Magnet Array" 2010 Int.Conference on Electrical Machines and Systems (ICEMS), pp. 1103-1106, Oct. 2010 (Year: 2010).*

Z.Q.Zhu et al. "Optimal Dimensioning of a High-Speed Brushless Motor with Diametrically Magnetised Rotor", IEEE, 1997. (Year: 1997).*

European Search Report dated Jun. 11, 2018 issued in EP Application No. 167437136.6.

International Search Report (Full English Text) and Written Opinion (Full English Text) dated Jun. 7, 2016 issued in Application No. PCT/KR2016/000956.

European Office Action dated May 2, 2019 issued in EP Application No. 16743713.6.

* cited by examiner

BLDC MOTOR AND CLEANER HAVING THE SAME

CROSS-REFERENCE TO RELATED PATENT APPLICATIONS

This application is a U.S. National Stage Application under 35 U.S.C. § 371 of PCT Application No. PCT/KR2016/000956, filed Jan. 28, 2016, which claims priority to Korean Patent Application No. 10-2015-0013691, filed on Jan. 28, 2015, whose entire disclosures are hereby incorporated by reference.

TECHNICAL FIELD

The present disclosure relates to a brushless direct current (BLDC) motor and a cleaner having the same, and more particularly to a BLDC motor including a plurality of magnets mounted at a shaft and a cleaner having the same.

BACKGROUND ART

A brushless direct current (BLDC) motor, which is a kind of DC motor, is configured such that a rotor includes a magnet, whereby no brush is needed.

The BLDC motor may include a motor housing, a stator disposed in the motor housing, and a magnet located inside the stator.

The BLDC motor generates low noise, and is suitable for high-speed rotation. In a case in which the BLDC motor is applied to a cleaner, an impeller for suctioning air and moving the suctioned air into a duct collection unit may rotate at a high speed.

It is required for the BLDC motor to rotate at a high speed with high efficiency.

DISCLOSURE OF DISCLOSURE

Technical Problem

Therefore, the present disclosure has been made in view of the above problems, and it is an object of the present disclosure to provide a brushless direct current (BLDC) motor having low eddy current loss and high efficiency and a cleaner having the same.

Solution to Problem

In accordance with an aspect of the present disclosure, the above and other objects can be accomplished by the provision of a brushless direct current (BLDC) motor including a shaft made of a nonmagnetic material, a plurality of magnets surrounding the outer circumference of the shaft, a stator surrounding the outer circumferences of the magnets, wherein each of the magnets has an arc-shaped outer circumferential surface, an arc-shaped inner circumferential surface facing the shaft, and opposite side surfaces facing other adjacent magnets, and the magnets include a first magnet magnetized in a direction directed from the outer circumferential surface to the inner circumferential surface, a second magnet magnetized in a direction directed from the inner circumferential surface to the outer circumferential surface, and a third magnet magnetized in a direction directed from one side surface to the other side surface.

The first magnet and the second magnet may be opposite to each other while the shaft is located between the first magnet and the second magnet.

The third magnet may be located between the first magnet and the second magnet in a circumferential direction.

The third magnet may include a plurality of third magnets sequentially arranged along the outer circumference of the shaft.

The third magnet may include a plurality of left-side third magnets and a plurality of right-side third magnets. The left-side third magnets may be located on the left side of the second magnet, the shaft, and the first magnet, and the right-side third magnets may be located on the right side of the second magnet, the shaft, and the first magnet.

The left-side third magnets and the right-side third magnets may be magnetized toward the second magnet.

Each of the magnets may be configured such that an angle between a first extension line connecting from the center of rotation of the shaft to the one side surface and a second extension line connecting from the center of rotation of the shaft to the other side surface is one selected from among 36 degrees, 45 degrees, and 60 degrees.

The BLDC motor may further include a sleeve surrounding the magnets, the sleeve being made of carbon fiber.

The shaft may be made of stainless steel (STS).

In accordance with another aspect of the present disclosure, there is provided a cleaner including a BLDC motor having a shaft, an impeller mounted at the shaft, and an impeller cover surrounding the impeller, the impeller cover being configured to guide air driven by the impeller into the BLDC motor, wherein the BLDC motor includes a plurality of magnets surrounding the outer circumference of the shaft, a stator surrounding the outer circumferences of the magnets, each of the magnets has an arc-shaped outer circumferential surface, an arc-shaped inner circumferential surface facing the shaft, and opposite side surfaces facing other adjacent magnets, and the magnets include a first magnet magnetized in a direction directed from the outer circumferential surface to the inner circumferential surface, a second magnet magnetized in a direction directed from the inner circumferential surface to the outer circumferential surface, and a third magnet magnetized in a direction directed from one side surface to the other side surface.

The first magnet and the second magnet may be opposite to each other while the shaft is located between the first magnet and the second magnet.

The third magnet may be located between the first magnet and the second magnet in a circumferential direction.

The third magnet may include a plurality of third magnets sequentially arranged along the outer circumference of the shaft.

The third magnet may include a plurality of left-side third magnets and a plurality of right-side third magnets. The left-side third magnets may be located on the left side of the second magnet, the shaft, and the first magnet, and the right-side third magnets may be located on the right side of the second magnet, the shaft, and the first magnet.

The left-side third magnets and the right-side third magnets may be magnetized toward the second magnet.

Each of the magnets may be configured such that an angle between a first extension line connecting from the center of rotation of the shaft to the one side surface and a second extension line connecting from the center of rotation of the shaft to the other side surface is one selected from among 36 degrees, 45 degrees, and 60 degrees.

The BLDC motor may further include a sleeve surrounding the magnets, the sleeve being made of carbon fiber.

Advantageous Effects of Disclosure

The present disclosure has the effect of smoothing the flow of flux, thereby maximizing the performance of magnets, and of minimizing eddy current loss using an assembly of a plurality of magnets having different directions of magnetization.

In addition, the present disclosure has the effect of optimizing a pattern of magnetization, thereby improving field energy.

BRIEF DESCRIPTION OF DRAWINGS

The above and other objects, features and other advantages of the present disclosure will be more clearly understood from the following detailed description taken in conjunction with the accompanying drawings, in which.

BEST MODE FOR CARRYING OUT THE DISCLOSURE

Hereinafter, embodiments of the present disclosure will be described in detail with reference to the accompanying drawings.

Figure 1:
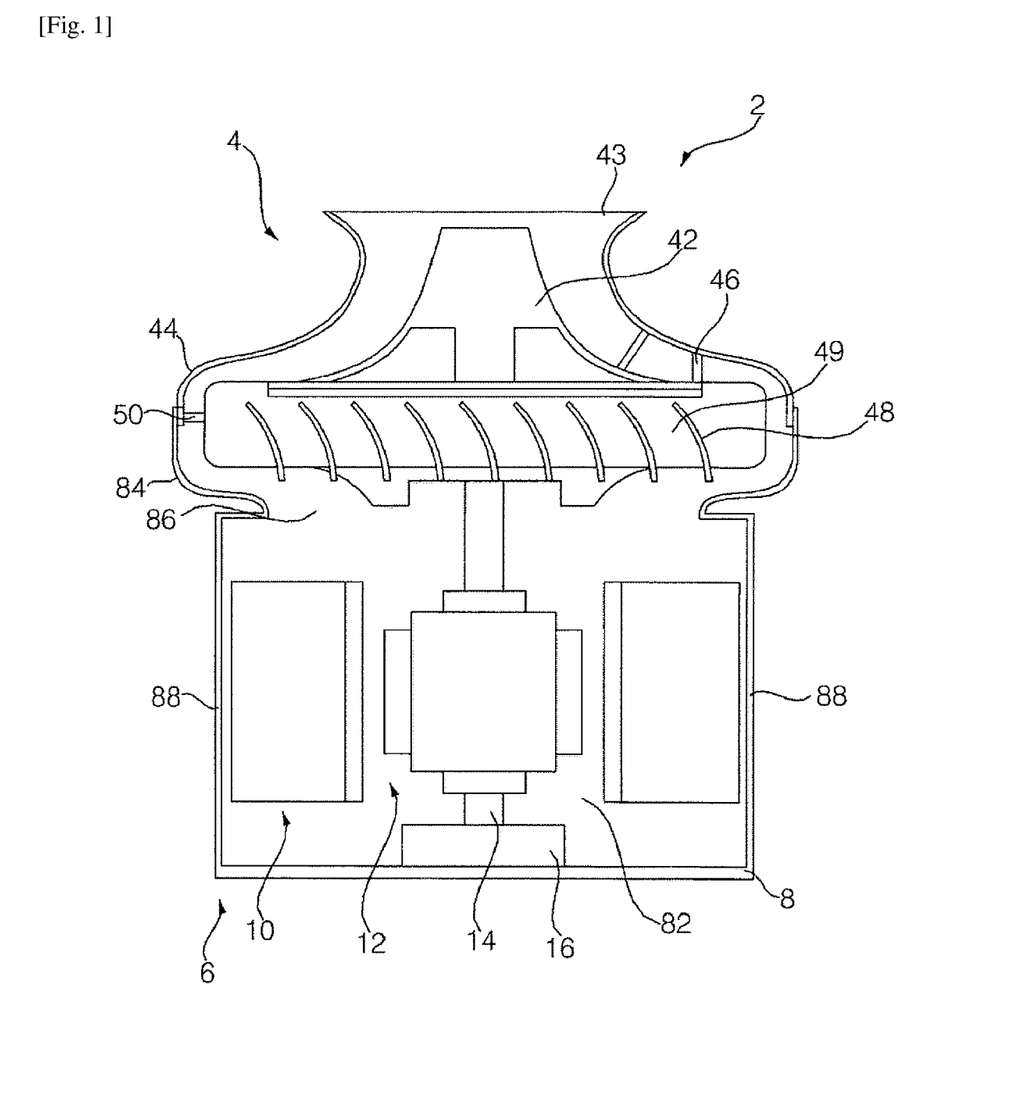
FIG. 1 is a view showing a fan motor assembly of an embodiment of a cleaner having a brushless direct current (BLDC) motor according to the present disclosure.

FIG. 1 is a view showing a fan motor assembly of an embodiment of a cleaner having a brushless direct current (BLDC) motor according to the present disclosure.

The cleaner having the BLDC motor may include a fan motor assembly 2 for suctioning air. The fan motor assembly 2 may include a fan 4 and a BLDC motor 6 for rotating the fan 4. The cleaner having the BLDC motor may further include a collection unit for collecting foreign matter in air flowing as the result of the operation of the fan motor assembly 2. The collection unit may include a dust collection net or a cyclone duct collection box, which is installed in front of the fan motor assembly 2 in a direction in which the air flows.

The fan 4 includes an impeller 42 and an impeller cover 44 configured to surround the impeller 42. The impeller cover 44 is provided with an air suction port 43.

The impeller 42 is constituted by a plurality of blades. The blades are curved in a circumferential direction. During the rotation of the impeller 42, air may be suctioned through the air suction port 43, and may then be discharged in a radial direction of the impeller 42. The impeller 42 may be mounted at a shaft 14, which will be described hereinafter in detail. When the shaft 14 is rotated as the result of driving of the BLDC motor 6, the impeller 42 may be rotated together with the shaft 14.

The impeller cover 44 may be coupled to a motor housing 8 of the BLDC motor 6.

The fan 4 may further include a diffuser 46 for forcibly feeding air discharged through the outlet of the impeller 42 and a guide vane 48 for guiding the air forcibly fed by the diffuser 46 into the motor.

The diffuser 46 may be located around the outside of the impeller 42. The air having passed through the impeller 42 is forcibly fed by the diffuser 46. At this time, speed energy may be converted into pressure energy.

The guide vane 48 may be located between the diffuser 46 and the BLDC motor 6 in the direction in which the air flows. The fan 4 may further include a disk body 49. The guide vane 48 may be formed at the outer circumference of the disk body 49. The disk body 49 may have a coupling part 50, which is coupled to at least one selected from between the impeller cover 44 and the motor housing 8.

The BLDC motor 6 may be a 3-phase, 2-pole, 3-slot BLDC motor.

The BLDC motor 6 may include a motor housing 8, a stator 10, and a rotor 12. The BLDC motor 6 may further include a bearing 16 mounted in the motor housing 8 for supporting the shaft 14.

The motor housing 8 may define the external appearance of the BLDC motor 6. In the motor housing 8 may be defined a space 82 for receiving the stator 10 and the rotor 12. The motor housing 8 may be formed in the shape of a cup when viewed in section. One surface of the motor housing 8 that faces the impeller cover 44 may be open.

The motor housing 8 may be provided with an impeller cover coupling part 84, which is coupled to the impeller cover 44. One selected from between the impeller cover coupling part 84 and the impeller cover 44 may be inserted into the other selected from between the impeller cover coupling part 84 and the impeller cover 44. The impeller cover coupling part 84 and the impeller cover 44 may be coupled to each other by means of a fastening member, such as a screw, or a hanger member, such as a hook.

Heat may be dissipated from the BLDC motor 6 due to air that is blown by the fan 4. The motor housing 8 may be provided with an opening 86, through which the air blown by the fan 4 is introduced into the motor housing 8.

The motor housing 8 may include an air discharge port 88, through which the air having cooled the interior of the BLDC motor 6 is discharged from the BLDC motor 6. The air discharge port 88 may be formed in at least one selected from between the circumference of the motor housing 8 and the side of the motor housing 8 opposite to the opening 86.

Figure 2:
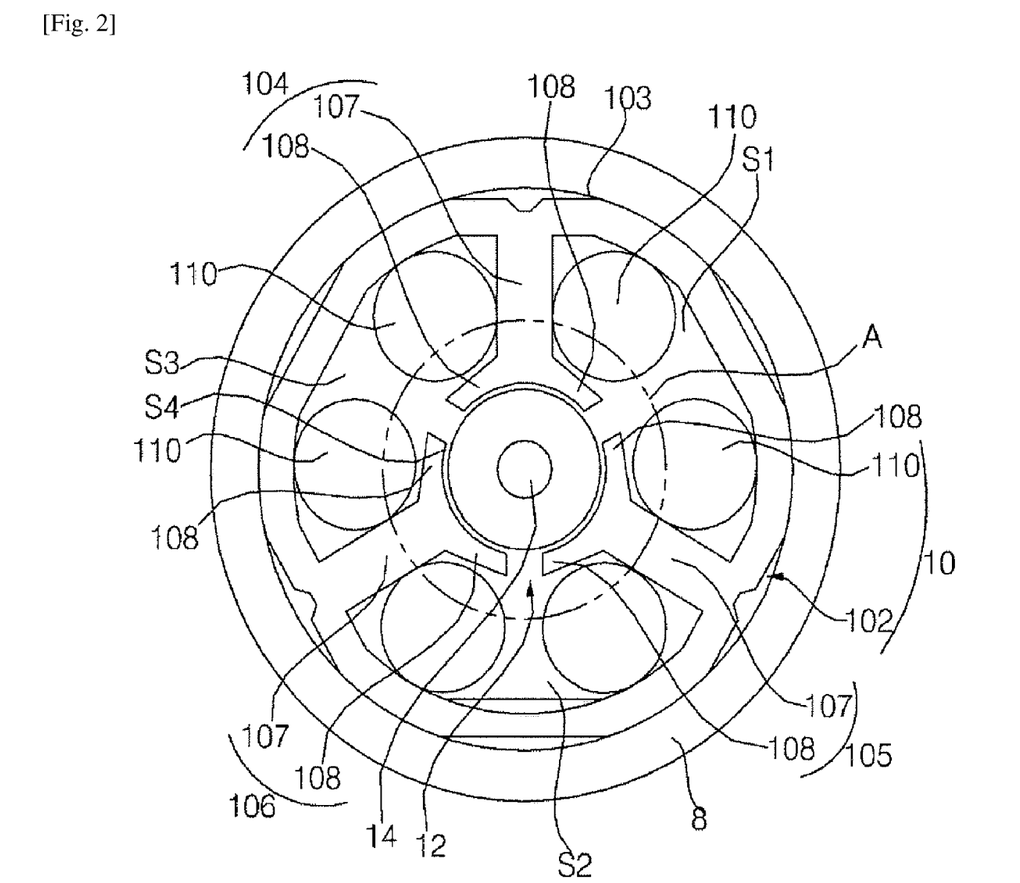
FIG. 2 is a cross-sectional view showing a stator and a rotor of an embodiment of the BLDC motor shown in FIG. 1.
Figure 3:
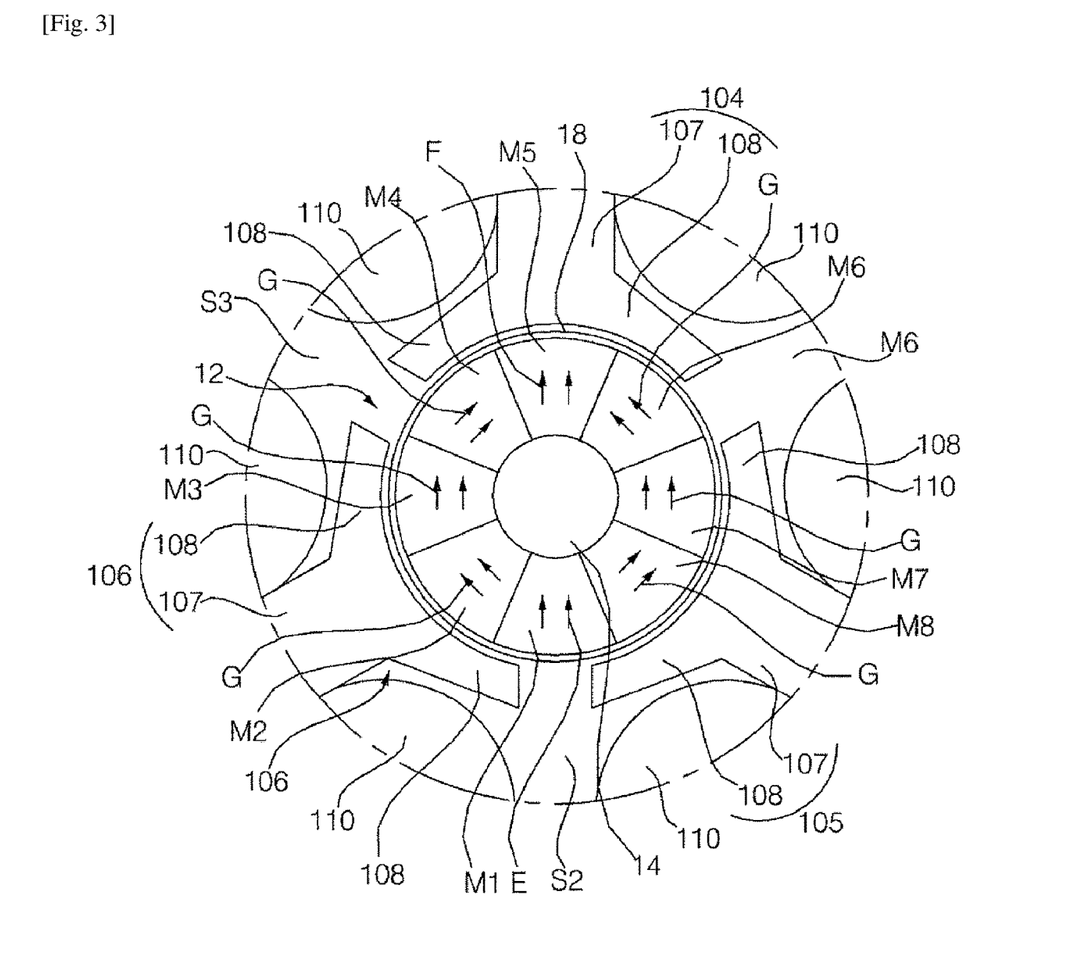
FIG. 3 is an enlarged sectional view showing part A of FIG. 2.
Figure 4:
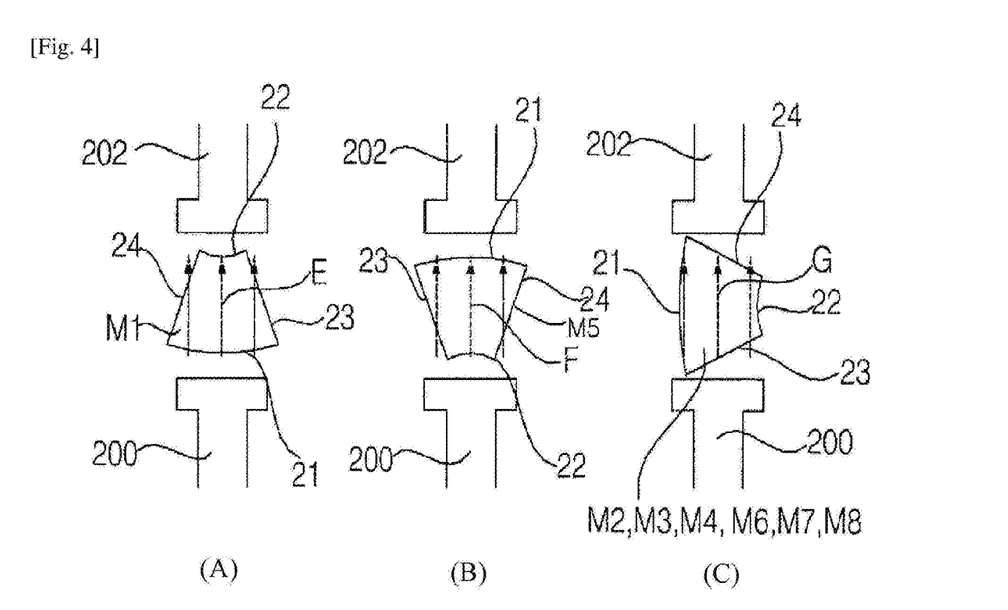
FIG. 4 is a view showing a magnet magnetization direction in the embodiment of the BLDC motor according to the present disclosure.
Figure 5:
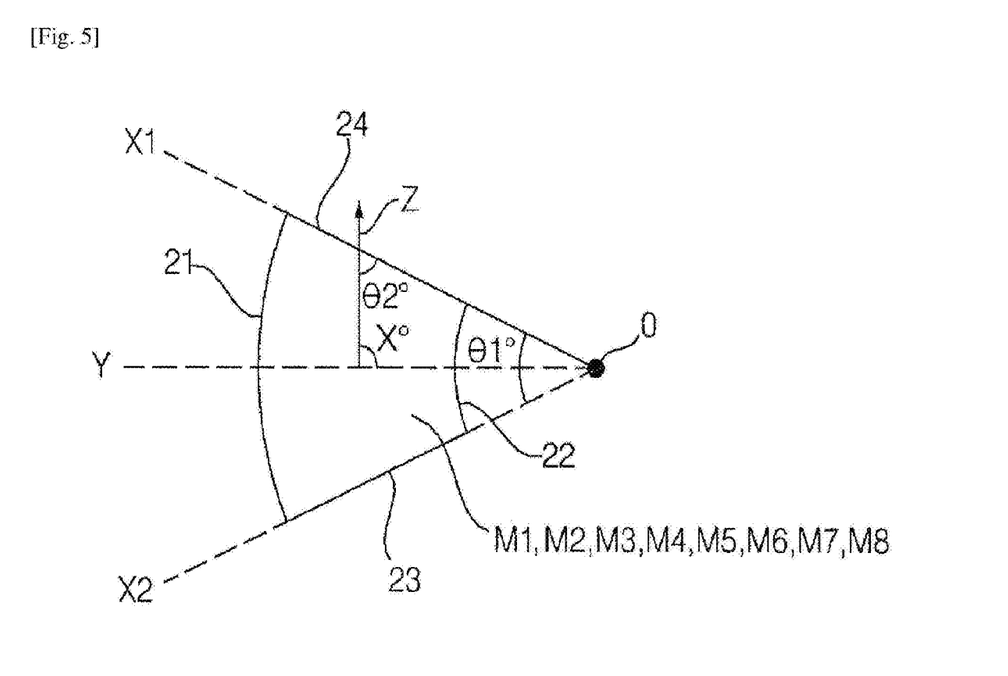
FIG. 5 is a view showing a magnet magnetization angle in the embodiment of the BLDC motor according to the present disclosure.

FIG. 2 is a cross-sectional view showing a stator and a rotor of an embodiment of the BLDC motor shown in FIG. 1, FIG. 3 is an enlarged sectional view showing part A of FIG. 2, FIG. 4 is a view showing a magnet magnetization direction in the embodiment of the BLDC motor according to the present disclosure, and FIG. 5 is a view showing a magnet magnetization angle in the embodiment of the BLDC motor according to the present disclosure.

The BLDC motor 6 may include a shaft 14, which is made of a nonmagnetic material, and a plurality of magnets M1, M2, M3, M4, M5, M6, M7, and M8, which surround the outer circumference of the shaft 14.

Since the shaft 14 is made of a nonmagnetic material, little flux flows in the shaft 14. The shaft 14 may be made of stainless steel (STS).

The magnets M1, M2, M3, M4, M5, M6, M7, and M8 may constitute the rotor 12.

The BLDC motor 6 may further include a sleeve 18. The sleeve 18 may surround the magnets M1, M2, M3, M4, M5, M6, M7, and M8. The sleeve 18 may constitute the rotor 12 together with the magnets M1, M2, M3, M4, M5, M6, M7, and M8. The sleeve 18 may be made of carbon fiber. The sleeve 18 may protect the magnets M1, M2, M3, M4, M5, M6, M7, and M8. The sleeve 18 may define the external appearance of the rotor 12.

The stator 10 includes a stator core 102 and a coil 110 wound on the stator core 102.

The stator 10 may surround the magnets M1, M2, M3, M4, M5, M6, M7, and M8. The stator core 102 may include a back yoke 103 having teeth 104, 105, and 106 protruding therefrom.

The stator core 102 may surround the magnets M1, M2, M3, M4, M5, M6, M7, and M8. The back yoke 103 may have therein spaces S4 for receiving the magnets M1, M2, M3, M4, M5, M6, M7, and M8 and the shaft 14.

The teeth 104, 105, and 106 may protrude from the back yoke 103. Specifically, the teeth 104, 105, and 106 may protrude from the inner circumference of the back yoke 103. The teeth 104, 105, and 106 may be arranged along the back yoke 103 at equal intervals. The stator core 102 may have spaces S1, S2, and S3, which are defined between the respective teeth 104, 105, and 106. The coil 110 may be located in the spaces S1, S2, and S3. The BLDC motor 6 may include the three teeth 104, 105, and 106, which protrude from the back yoke 103 toward a magnet 122. In this case, the BLDC motor 6 may be a 3-slot BLDC motor. Each of the teeth 104, 105, and 106 may include a neck 107 protruding from the back yoke 103 and a shoe 108 protruding from the neck 107 in a direction such that the magnets M1, M2, M3, M4, M5, M6, M7, and M8 are partially surrounded.

The spaces S1, S2, and S3, in which the coil 110 can be received, of the stator core 102 may be defined between the respective necks 107. The spaces S4, in which the magnets M1, M2, M3, M4, M5, M6, M7, and M8 can be received, of the stator core 102 may be defined between the respective shoes 108.

The coil 110 may be a 3-phase coil.

The magnets M1, M2, M3, M4, M5, M6, M7, and M8 may be arranged so as to surround the outer circumference of the shaft 14 in a ring shape.

Six to ten magnets (shown in the figures as eight magnets M1, M2, M3, M4, M5, M6, M7, and M8) may be disposed around the shaft 14. The rotor 12 may include the magnets M1, M2, M3, M4, M5, M6, M7, and M8, which surround the shaft 14 in a divided state. The rotor 12 may be configured to have a divided structure.

A part of each of the magnets M1, M2, M3, M4, M5, M6, M7, and M8 that faces the shaft 14 is provided with a semicircular recess. The magnets M1, M2, M3, M4, M5, M6, M7, and M8 may surround the outer circumference of the shaft 14.

Each of the magnets M1, M2, M3, M4, M5, M6, M7, and M8 may have an arc-shaped outer circumferential surface 21 and an arc-shaped inner circumferential surface 22. Opposite side surfaces 23 and 24 of each of the magnets M1, M2, M3, M4, M5, M6, M7, and M8, which connect the outer circumferential surface 21 with inner circumferential surface 22, may be formed in a straight line. The magnets M1, M2, M3, M4, M5, M6, M7, and M8 may be bonded to the outer circumferential surface of the shaft 14.

Each of the magnets M1, M2, M3, M4, M5, M6, M7, and M8 may have an arc-shaped outer circumferential surface 21, an arc-shaped inner circumferential surface 22 facing the shaft 14, and opposite side surfaces 23 and 24 facing other adjacent magnets. Each of the magnets M1, M2, M3, M4, M5, M6, M7, and M8 may include an outer circumferential surface 21, one side surface 23, an inner circumferential surface 22, and the other side surface 24.

The magnets M1, M2, M3, M4, M5, M6, M7, and M8 may each have the same shape. The magnets M1, M2, M3, M4, M5, M6, M7, and M8 may each have the same size.

The magnets M1, M2, M3, M4, M5, M6, M7, and M8 include a first magnet M1 magnetized in a direction E directed from the outer circumferential surface 21 to the inner circumferential surface 22, a second magnet M5 magnetized in a direction F directed from the inner circumferential surface 22 to the outer circumferential surface 21, and third magnets M2, M3, M4, M6, M7, and M8 magnetized in a direction G directed from one side surface 23 to the other side surface 24. As used herein, a direction of magnetism may refer to a vector extending between a negative (south) pole and a positive (north) pole of a magnet.

As shown in FIG. 3, the first magnet M1 and the second magnet M5 may be opposite to each other in a state in which the shaft 14 is located between the first magnet M1 and the second magnet M5. The first magnet M1 and the second magnet M5 may be arranged at the outer circumference of the shaft 14 so as to have a phase difference of 180 degrees. When the shaft 14 is rotated 180 degrees, the positions of the first magnet M1 and the second magnet M5 may be inversed.

The third magnets M2, M3, M4, M6, M7, and M8 may be located between the first magnet M1 and the second magnet M5 in a circumferential direction. The third magnets M2, M3, M4, M6, M7, and M8 may surround the remaining parts of the shaft 14 that are not surrounded by the first magnet M1 and the second magnet M5. The third magnets M2, M3, M4, M6, M7, and M8 may be sequentially arranged along the outer circumference of the shaft 14. The third magnets M2, M3, M4, M6, M7, and M8 may surround the remaining parts of the shaft 14 that are not surrounded by the first magnet M1 and the second magnet M5.

The magnets constituting the rotor 12 may be generally magnetized in a direction of the first magnet M1, then to the third magnets M2, M3, M4, M6, M7, and M8, and then to the second magnet M5.

Referring to FIG. 3, the third magnets M2, M3, M4, M6, M7, and M8 may include a plurality of left-side third magnets (or a first plurality of third magnets) M2, M3, and M4 and a plurality of right-side third magnets (or a second plurality of third magnets) M6, M7, and M8.

Referring to FIG. 3, the left-side third magnets M2, M3, and M4 may be located on the left side of the second magnet M5, the shaft 14, and the first magnet M1, and the right-side third magnets M6, M7, and M8 may be located on the right side of the second magnet M5, the shaft 14, and the first magnet M1.

The left-side third magnets M2, M3, and M4 and the right-side third magnets M6, M7, and M8 may be symmetric with respect to the second magnet M5, the shaft 14, and the first magnet M1. The left-side third magnets M2, M3, and M4 and the right-side third magnets M6, M7, and M8 may be magnetized in the direction toward the second magnet M5.

When the shaft 14 is rotated 180 degrees, the positions of the left-side third magnets M2, M3, and M4 and the right-side third magnets M6, M7, and M8 may be inversed.

The rotor 12 may be divided into two poles, such as an N pole and an S pole. A 180 degree part of the rotor 12 may have an N pole, and another 180 degree part of the rotor 12 may have an S pole. The BLDC motor 6 may be a 2-pole BLDC motor. Here, the N pole and the S pole are divided from each other at one of the left-side third magnets M2, M3, and M4 and one of the right-side third magnets M6, M7, and M8.

In a case in which the rotor 12 includes 8 magnets, the BLDC motor 6 may have a 2-pole, 8-division pattern of magnetization.

The first magnet M1 shown in section (A) of FIG. 4 may be magnetized between a pair of magnetizing yokes 200 and 202 for magnetizing the magnet, and may be magnetized in a direction directed from the outer circumferential surface 21 to the inner circumferential surface 22. The first magnet M1 may be magnetized in a direction E perpendicular to a tangent line of the center of the outer circumferential surface 21 and to a tangent line of the center of the inner circumferential surface 22.

The second magnet M5 shown in section (B) of FIG. 4 may be magnetized between a pair of magnetizing yokes 200 and 202 for magnetizing the magnet, and may be magnetized in a direction directed from the inner circumferential surface 22 to the outer circumferential surface 21. The second magnet M5 may be magnetized in a direction F perpendicular to a tangent line of the center of the inner circumferential surface 22 and to a tangent line of the center of the outer circumferential surface 21.

The third magnets M2, M3, M4, M6, M7, and M8 shown in section (C) of FIG. 4 may be magnetized between a pair of magnetizing yokes 200 and 202 for magnetizing the magnets, and may be magnetized in a direction directed from one side surface 23 to the other side surface 24, or a direction directed from the other side surface 24 to the one side surface 23.

Each of the magnets M1, M2, M3, M4, M5, M6, M7, and M8 is configured such that an angle $\theta 1$ between a first extension line X1 connecting from the center 0 of rotation of the shaft to one side surface 23 and a second extension line X2 connecting from the center 0 of rotation of the shaft to the other side surface 24 may be one selected from among 36 degrees, 45 degrees, and 60 degrees.

Here, the first extension line X1 and the second extension line X2 may be division lines for dividing the magnets. The angle $\theta 1$ between the first extension line X1 and the second extension line X2 may be a division angle $\theta 1$ by which the magnets are divided from each other.

The division angle $\theta 1$ may be defined by Equation 1 below.

$$\theta 1 = 360/N \qquad \text{[Equation 1]}$$

Where N indicates the number of magnets surrounding the shaft 14. N may be one selected from among 6, 8, and 10.

In a case in which the number of magnets is 10, the division angle $\theta 1$ is 36 degrees. In a case in which the number of magnets is 8, the division angle $\theta 1$ is 45 degrees. In a case in which the number of magnets is 6, the division angle $\theta 1$ is 60 degrees.

Each of the magnets M1, M2, M3, M4, M5, M6, M7, and M8 may have a magnetizing angle X.

The magnetizing angle X may be set based on the middle line Y between the first extension line X1 and the second extension line X2. Here, the middle line Y may be located between the first extension line X1 and the second extension line X2.

The magnetizing angle X of the first magnet M1 and the magnetizing angle X of the second magnet M5 may be identical to or parallel to the middle line Y In a case in which the magnetizing angle X shown in FIG. 5 is 0 degrees, this magnet may be the first magnet M1, magnetized in the direction directed from the outer circumferential surface 21 to the inner circumferential surface 22.

In a case in which the magnetizing angle X shown in FIG. 5 is 180 degrees, this magnet may be the second magnet M5, magnetized in the direction directed from the inner circumferential surface 22 to the outer circumferential surface 21.

The magnetizing angle X of the third magnets M2, M3, M4, M6, M7, and M8 may be defined by Equation 2 below.

$$\theta 2 = 180° - (\theta 1/2 + X) \qquad \text{[Equation 2]}$$

Where $\theta 2$ indicates an angle between a line Z in a direction of magnetization and the first extension line X1, and X indicates the magnetizing angle of the third magnets M2, M3, M4, M6, M7, and M8.

A direction G in which each of the third magnets M2, M3, M4, M6, M7, and M8 is magnetized may be symmetric to the middle line Y.

Figure 6:
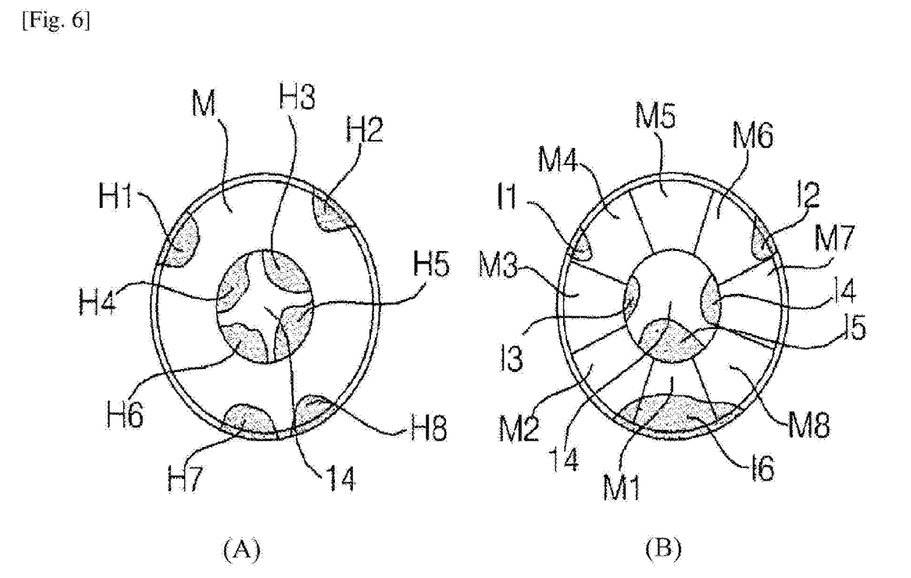
FIG. 6 is a view showing eddy current loss in the embodiment of the BLDC motor according to the present disclosure and eddy current loss in a comparative example.
Figure 7:
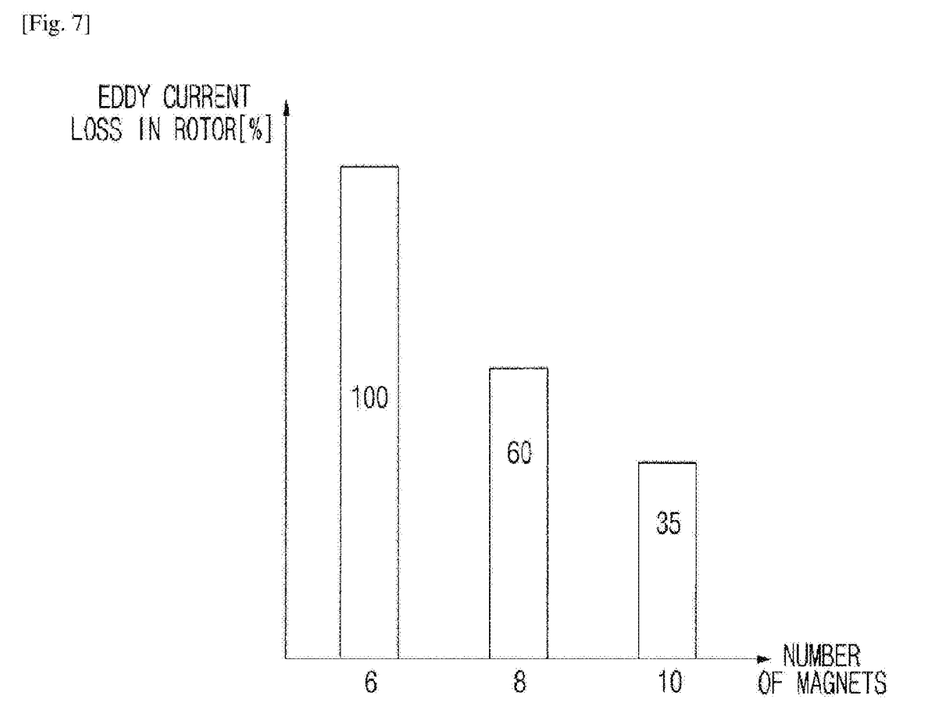
FIG. 7 is a view showing eddy current loss in the rotor based on the number of magnets in the embodiment of the BLDC motor according to the present disclosure.

FIG. 6 is a view showing eddy current loss in the embodiment of the BLDC motor according to the present disclosure and eddy current loss in a comparative example, and FIG. 7 is a view showing eddy current loss in the rotor based on the number of magnets in the embodiment of the BLDC motor according to the present disclosure.

In a case in which the rotor 12 includes 6 divided magnets, these magnets may include one first magnet M1, one second magnet M5, and four third magnets. In a case in which the rotor 12 includes 8 divided magnets, these magnets may include one first magnet M1, one second magnet M5, and six third magnets. In a case in which the rotor 12 includes 10 divided magnets, these magnets may include one first magnet M1, one second magnet M5, and eight third magnets.

In a case in which the rotor 12 of the BLDC motor 6 does not have a divided magnet type structure shown in figures, the eddy current loss in the rotor may be high. In a case in which the rotor 12 of the BLDC motor 6 is configured to have a divided magnet type structure having different magnetizing directions according to the present disclosure, the eddy current loss in the rotor may be low.

Section (A) of FIG. 6 is a view showing saturation of eddy current loss in the comparative example, and second (B) of FIG. 6 is a view showing saturation of eddy current loss in the BLDC motor according to the present disclosure.

Specifically, section (A) of FIG. 6 is a view showing saturation of eddy current loss in a case in which a undivided magnet M is provided as a comparative example, and section (B) of FIG. 6 is a view showing saturation of eddy current loss in a case in which 8 divided magnets are provided.

It can be seen that the sum of the saturations of eddy current loss I1, I2, I3, I4, I5, and I6 shown in section (B) of FIG. 6 is less than the sum of the saturations of eddy current loss H1, H2, H3, H4, H5, and H6 shown in section (A) of FIG. 6. In addition, it can be seen that in a case in which the first magnet M1, the second magnet M5, and the third magnets M2, M3, M4, M6, M7, and M8, which have different magnetizing directions, surround the shaft 14, eddy current loss in the rotor is reduced.

Meanwhile, in a case in which the number of divided magnets is 4 or less, the effect of magnet loss reduction in the BLDC motor 6 is not significant. According to the present disclosure, therefore, 6 or more magnets are provided. However, in a case in which the number of divided magnets is 12 or more, the number of parts may be increased, and the assembly process may be complicated, whereby productivity may be reduced.

In the BLDC motor 6 according to the present disclosure, the number of divided magnets may be one selected from among 6, 8, and 10.

Referring to FIG. 7, on the assumption that eddy current loss in the rotor is 100% in a case in which the number of magnets is 6, eddy current loss in the rotor may be about 60% in a case in which the number of magnets is 8, and eddy current loss in the rotor may be about 35% in a case in which the number of magnets is 10. In the BLDC motor 6, therefore, the number of divided magnets may be one selected from among 6, 8, and 10.

Mode for the Disclosure

Various embodiments have been described in the best mode for carrying out the disclosure.

INDUSTRIAL APPLICABILITY

The present disclosure is applied to the fields related to a brushless direct current (BLDC) motor and a cleaner having the same.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A brushless direct current (BLDC) motor comprising:
a shaft made of a nonmagnetic material;
a plurality of magnets provided at an outer circumference of the shaft; and
a stator provided around outer circumferences of the magnets,
wherein:
each of the magnets has:
an outer circumferential surface;
an inner circumferential surface facing the outer circumference of the shaft; and
opposite side surfaces extending between the inner circumferential surface and the outer circumferential surface, each of the side surfaces facing an adjacent other one of the magnets, and
the magnets include:
a first magnet magnetized in a direction from the outer circumferential surface of the first magnet to the inner circumferential surface of the first magnet;
a second magnet magnetized in a direction from the inner circumferential surface of the second magnet to the outer circumferential surface of the second magnet; and
third magnets that are magnetized, respectively, between the side surfaces of the third magnets,
the first magnet and the second magnet are positioned on opposite radial directions of the shaft,
the third magnets include:
a first plurality of third magnets extending between the first magnet and the second magnet in a first circumferential direction of the shaft; and
a second plurality of third magnets extending between the first magnet and the second magnet in a second circumferential direction of the shaft that is opposite to the first circumferential direction, and
each of the first plurality of third magnets is magnetized in the same first circumferential direction toward the second magnet, and each of the second plurality of third magnets is magnetized in the same second circumferential direction toward the second magnet.

2. The BLDC motor according to claim 1, wherein each of the magnets is configured such that an angle between a first extension line connecting from a center of rotation of the shaft to the one side surface and a second extension line connecting from the center of rotation of the shaft to the other side surface is one of 36 degrees, 45 degrees, or 60 degrees.

3. The BLDC motor according to claim 1, further comprising a sleeve surrounding the magnets, the sleeve being made of carbon fiber.

4. The BLDC motor according to claim 1, wherein the shaft is made of stainless steel (STS).

5. The BDLC motor according to claim 1, wherein:
the stator includes a stator core; and a coil that is received in the stator core, and
the stator core includes:
a back yoke that is spaced from the magnets;
a plurality of necks that protrude radially inward from the back yoke toward the magnets; and
a plurality of shoes that protrude, respectively, from the plurality of necks such that each of the shoes is positioned adjacent to one of the first magnet or the second magnet and at least one of the third magnets.

6. A cleaner comprising:
a brushless direct current (BLDC) motor having a shaft;
an impeller mounted on the shaft; and
an impeller cover surrounding the impeller, the impeller cover being configured to guide air driven by the impeller into the BLDC motor,
wherein:
the BLDC motor includes:
a plurality of magnets surrounding an outer circumference of the shaft; and
a stator surrounding outer circumferences of the magnets,
each of the magnets has:
an outer circumferential surface;
an inner circumferential surface facing the shaft; and
opposite side surfaces extending between the inner circumferential surface and the outer circumferential surface, each of the side surfaces facing an adjacent other one of the magnets, and
the magnets include:
a first magnet magnetized in a direction from the outer circumferential surface of the first magnet to the inner circumferential surface of the first magnet;
a second magnet magnetized in a direction from the inner circumferential surface of the second magnet to the outer circumferential surface of the second magnet; and
a third magnet magnetized in a direction from one of the side surfaces of the third magnet to another of the side surfaces of the third magnet,
the first magnet and the second magnet are positioned on opposite radial directions of the shaft,
wherein the magnets are composed of one of the first magnet, one of the second magnets, and a plurality of the third magnets,
the third magnet includes:
a first plurality of third magnets extending between the first magnet and the second magnet in a first circumferential direction of the shaft; and
a second plurality of third magnets extending between the first magnet and the second magnet in a second circumferential direction of the shaft that is opposite to the first circumferential direction, and each of the first plurality of third magnets is magnetized in the same first circumferential direction toward the second magnet, and each of the second plurality of third magnets is magnetized in the same second circumferential direction toward the second magnet.

7. The cleaner according to claim 6, wherein each of the magnets is configured such that an angle between a first extension line connecting from a center of rotation of the shaft to the one side surface and a second extension line connecting from the center of rotation of the shaft to the other side surface is one of 36 degrees, 45 degrees, or 60 degrees.

8. The cleaner according to claim 6, wherein the BLDC motor further includes a sleeve surrounding the magnets, the sleeve being made of carbon fiber.

9. The cleaner according to claim 6, wherein the stator includes a stator core; and a coil that is received in the stator core, and the stator core includes:
- a back yoke that is spaced from the magnets;
- a plurality of necks that protrude radially inward from the back yoke toward the magnets; and
- a plurality of shoes that protrude, respectively, from the plurality of necks such that each of the shoes is positioned adjacent to one of the first magnet or the second magnet and at least one of the third magnets.

* * * * *